United States Patent
Su et al.

(10) Patent No.: US 7,826,747 B2
(45) Date of Patent: Nov. 2, 2010

(54) OPTICAL BURST TRANSPORT USING AN ELECTRO-OPTIC SWITCH

(75) Inventors: Ching-Fong Su, Milpitas, CA (US); Takeo Hamada, Cupertino, CA (US); Richard R. Rabbat, Mountain View, CA (US); Alexei L. Glebov, San Mateo, CA (US)

(73) Assignee: Fujitsu Limited, Kawasaki (JP)

( * ) Notice: Subject to any disclaimer, the term of this patent is extended or adjusted under 35 U.S.C. 154(b) by 798 days.

(21) Appl. No.: 11/563,505

(22) Filed: Nov. 27, 2006

(65) Prior Publication Data
US 2008/0124077 A1    May 29, 2008

(51) Int. Cl.
*H04J 14/02* (2006.01)
*H04J 14/00* (2006.01)

(52) U.S. Cl. ............................ 398/83; 398/48; 398/55

(58) Field of Classification Search ............ 398/83, 398/84, 85, 48, 49, 50, 55, 56
See application file for complete search history.

(56) References Cited

U.S. PATENT DOCUMENTS

| | | | |
|---|---|---|---|
| 4,609,920 A | 9/1986 | Segarra | |
| 4,661,952 A | 4/1987 | von Sichart et al. | |
| 4,663,748 A | 5/1987 | Karbowiak et al. | |
| 4,858,232 A | 8/1989 | Diaz et al. | |
| 4,993,025 A | 2/1991 | Vesel et al. | |
| 5,081,623 A | 1/1992 | Ainscow | |
| 5,418,785 A | 5/1995 | Olshansky et al. | 370/85.5 |
| 5,500,857 A | 3/1996 | Nakata | 370/50 |
| 6,032,185 A | 2/2000 | Asano | |
| 6,816,296 B2 | 11/2004 | Romanovsky | 359/245 |
| 6,965,933 B2 | 11/2005 | Haartsen | |
| 7,092,633 B2 | 8/2006 | Fumagalli et al. | |
| 7,092,663 B2 | 8/2006 | Takahashi et al. | |
| 7,139,484 B2 | 11/2006 | Kurumida et al. | 398/83 |
| 2001/0028486 A1 | 10/2001 | Kashima | 359/118 |

(Continued)

FOREIGN PATENT DOCUMENTS

EP    1 367 754 A2    5/2003

(Continued)

OTHER PUBLICATIONS

"Grid Datafarm: Record Speed Data Processing between Japan and U.S.," pp. 7-9. "Grid Datafarm Bandwidth Challenge at SC2002," http://datafarm.apgrid.org/event/bwc02/, 2003.

(Continued)

*Primary Examiner*—Ken N Vanderpuye
*Assistant Examiner*—Daniel G Dobson
(74) *Attorney, Agent, or Firm*—Baker Botts L.L.P.

(57) ABSTRACT

An optical node for optical burst transport includes optical components operable to transmit and receive optical signals over an optical transmission medium. The optical components include a demultiplexer that is operable to receive a wavelength division multiplexed (WDM) optical signal at an input port and to separate the WDM optical signal into two or more constituent wavelength signals, and a switching matrix that includes one or more electro-optic switches. Each electro-optic switch is operable to receive a wavelength signal and switch the signal to one of two outputs, and the outputs include an output port of the optical node and one or more drop output ports of the optical node.

14 Claims, 8 Drawing Sheets

U.S. PATENT DOCUMENTS

| | | | |
|---|---|---|---|
| 2001/0051913 A1 | 12/2001 | Vashistha et al. | |
| 2002/0126343 A1 | 9/2002 | Fumagalli et al. | 359/118 |
| 2002/0136230 A1 | 9/2002 | Dell et al. | |
| 2002/0184527 A1 | 12/2002 | Chun et al. | |
| 2003/0023499 A1 | 1/2003 | Das et al. | |
| 2003/0103514 A1 | 6/2003 | Nam et al. | 370/412 |
| 2005/0058149 A1 | 3/2005 | Howe | |
| 2005/0182639 A1 | 8/2005 | Dale | 705/1 |
| 2005/0207427 A1 | 9/2005 | Su et al. | 370/400 |
| 2005/0207440 A1 | 9/2005 | Tyan et al. | 370/454 |
| 2005/0207755 A1 | 9/2005 | Rabbat et al. | 398/59 |
| 2005/0226621 A1* | 10/2005 | Kikuchi et al. | 398/83 |
| 2006/0115210 A1 | 6/2006 | Nakagawa | 385/24 |
| 2006/0198299 A1 | 9/2006 | Brzezinski et al. | 370/229 |
| 2007/0172240 A1* | 7/2007 | Terai et al. | 398/83 |

FOREIGN PATENT DOCUMENTS

| | | | |
|---|---|---|---|
| WO | WO 2006035520 A1 * | 4/2006 | |

OTHER PUBLICATIONS

Jain, "Performance Analysis of FDDI," Digital Technical Journal, vol. 3, No. 3, 36 pages, 1991.

Leland et al., "On the Self-Similar Nature of Ethernet Traffic (Extended Version)," IEEE/ACM Transactions on Networking, vol. 2, No. 1, pp. 1-15, Feb. 1994.

"Information Technology-Telecommunications and Information Exchange Between Systems—Local and Metropolitan Area Networks—Specific Requirements—Part 5: Token Ring Access Method and Physical Layer Specifications," IEEE, cover & title page, pp. iv-x and pp. 1-243, 1998.

Qiao et al., "Optical Burst Switching (OBS)—A New Paradigm for an Optical Internet," Lab for Advanced Network Design, Evaluation and Research (LANDER), University at Buffalo, abstract page plus pp. 1-23, Jan. 1999.

White et al., "Architecture and Protocols for HORNET: A Novel Packet-over-WDM Multiple-Access MAN," Stanford University Optical Communications Research Laboratory, 5 pages, 2000.

Cai et al., "Lightring: A Distributed and Contention-Free Bandwidth On-Demand Architecture," pp. 1-14, 2001.

Xu et al., "Techniques for Optical Packet Switching and Optical Burst Switching," IEEE Communications Magazine, pp. 136-142, Jan. 2001.

Koetter et al., "Beyond Routing: An Algebraic Approach to Network Coding," IEEE, 9 pages, 2002.

Dunigan et al., "A TCP Tuning Daemon," IEEE, pp. 1-16, 2002.

Hiraki et al., "Data Reservoir: A New Approach to Data-Intensive Scientific Computation," 2002 International Symposium on Parallel Architecture, Algorithms, and Networks, 6 pages, May 2002.

Katabi et al., "Congestion Control for High Bandwidth-Delay Product Networks," ACM SIGCOMM, Pittsburgh, PA, 14 pages, Aug. 2002.

Kaur et al., "End-to-end Fairness Analysis of Fair Queuing Networks" Laboratory for Advanced Systems Research, Department of Computer Sciences, University of Texas at Austin, Proceedings of 23rd IEEE International Real-Time Systems Symposium, Austin, TX, pp. 1-10, Dec. 2002.

Nashimoto, "PLZT Thin Film Optical Waveguides and Devices," Nozomi Photonics Co., Ltd., pp. 1-6, 2003.

Glebov et al., "Electrooptic Planar Deflector Switches With Thin-Film PLZT Active Elements," IEEE Journal of Selected Topics in Quantum Electronics, vol. 11, No. 2, pp. 422-430, Mar./Apr. 2005.

Ayyangar et al., Label Switched Path Stitching with Generalized MPLS Traffic Engineering, Network Working Group, pp. 1-18/19, 2005.

Aggarwal et al., "Extensions to RSVP-TE for Point to Multipoint TE LSPs," Network Working Group, pp. 1-49/51, Oct. 2005.

Yasukawa, "Signaling Requirements for Point to Multipoint Traffic Engineered MPLS LSPs," Network Working Group, pp. 1-28, Dec. 2005.

Hamada et al., "Predictive Scheduling of Data Path Control," Pending U.S. Appl. No. 11/563,522, pp. 1-58 plus 8 sheets of drawings, filed Nov. 27, 2006.

Rabbat et al., "Multicast Transmissions in Optical Burst Transport," Pending U.S. Appl. No. 11/563,488, pp. 1-57, plus 8 sheets of drawings, filed Nov. 27, 2006.

Yan et al., "A Distributed Adaptive Protocol Providing Real-Time Services on WDM-Based LAN's," Journal of Lightwave Technology, vol. 14, No. 6, pp. 1245-1254, Jun. 1996.

Fumagalli et al., "A Token Based Protocol for Integrated Packet and Circuit Switching in WDM Rings," XP-000894455, IEEE, pp. 2339-2344, 1998.

Fumagalli et al., "The Multi-Token Inter-Arrival Time (MTIT) Access Protocol for Supporting IP Over WDM Ring Network," XP-000898333, IEEE, pp. 586-590, 1999.

EPO Search Report for Application No. 05251669.7-2415, 4 pages, Feb. 3, 2007.

EPO Search Report for Application No. 05251683.8-2415, 4 pages, Feb. 3, 2007.

The State IP Office of the People's Republic of China, The First Office Action (3 pages) and Text of the First Office Action (6 pages) (translation of Item S), Mar. 2, 2007.

The State IP Office of the People's Republic of China First Office Action (not translated), Chinese Application No. 200510055165.X (7 pages), Mar. 2, 2007.

Cisco Systems, "Fiber Distributed Data Interface," Internetworking Technologies Handbook, Copyright 2001, 14 pages, 2001.

* cited by examiner

OPTICAL BURST TRANSPORT USING AN ELECTRO-OPTIC SWITCH

TECHNICAL FIELD

This invention relates generally to the field of communication networks and, more specifically, to optical burst transport using an electro-optic switch.

BACKGROUND

Optical networks transmit data in the form of optical signals carried over optical fibers. To maximize utilization of network bandwidth, optical networks employ technology such as wavelength division multiplexing (WDM). For example, a WDM ring optical network transports data traffic between different points on the network. Conventional WDM ring architectures include nodes that use a coupler to tap off a fraction of the WDM signal from the WDM ring and that use one or more tunable filters and optical receivers to retrieve traffic in a particular wavelength(s) of the tapped WDM signal.

SUMMARY OF THE DISCLOSURE

In accordance with the present invention, disadvantages and problems associated with previous techniques for optical burst transport may be reduced or eliminated.

According to one embodiment of the present invention, an optical node for optical burst transport includes optical components operable to transmit and receive optical signals over an optical transmission medium. The optical components include a demultiplexer that is operable to receive a wavelength division multiplexed (WDM) optical signal at an input port and to separate the WDM optical signal into two or more constituent wavelength signals, and a switching matrix that includes one or more electro-optic switches. Each electro-optic switch is operable to receive a wavelength signal and switch the signal to one of two outputs, and the outputs include an output port of the optical node and one or more drop output ports of the optical node.

Certain embodiments of the invention may provide one or more technical advantages. A technical advantage of one embodiment includes providing an optical burst transport node using an electro-optic switch. The electro-optic switch operates at a higher speed than previously used acousto-optic tunable filters. Accordingly, the data transmission has a higher efficiency with the electro-optic switch in the node. Another technical advantage of an embodiment includes eliminating the need for wavelength blockers on the WDM ring. This simplifies the hardware design of the node.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 8B of the drawings, like numerals being used for like and corresponding parts of the various drawings.

Figure 1:
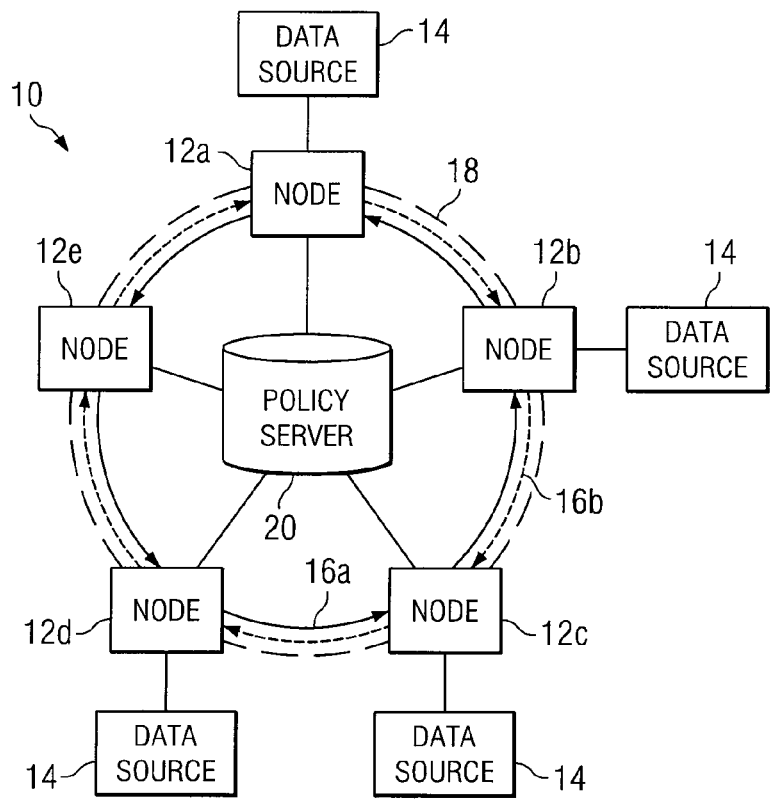
FIG. 1 is a block diagram illustrating a communication network that includes network nodes.

FIG. 1 is a block diagram illustrating a communication network 10 that includes network nodes 12, which operate in accordance with various embodiments of the present invention. In general, network 10 supports data transmission between nodes 12. More specifically, nodes 12 include an electro-optic switch that provides for more efficient communications in network 10.

According to particular embodiments, network 10 forms an optical communication ring and nodes 12 are optical communication nodes. The remainder of the discussion focuses primarily on the embodiment of network 10 and nodes 12 as optical equipment. However, it should be understood that the disclosed techniques may be used in any suitable type of network.

As illustrated, network 10 is an optical communication ring and nodes 12 are optical communication nodes. Network 10 utilizes WDM in which a number of optical channels are carried over a common path by modulating the channels by wavelength. A channel represents any suitable separation of available bandwidth, such as wavelength in WDM. However, it should be understood that network 10 may utilize any suitable multiplexing operation. Furthermore, although network 10 is illustrated as a ring network, network 10 may be any suitable type of network, including a mesh network or a point-to-point network. In embodiments where network 10 is a ring network, network 10 may operate in a clockwise and/or counterclockwise direction. For example, network 10 may include two opposing rings (or any other suitable number of fibers implementing any suitable number of rings).

Each node 12 represents hardware, including any appropriate controlling software and/or logic, capable of linking to other network equipment and communicating data. The software and/or logic may be embodied in a computer readable medium. Data may refer to any suitable information, such as video, audio, multimedia, control, signaling, other information, or any combination of the preceding. In particular embodiments, nodes 12 are used for optical burst transmissions. Optical burst transmission provides for optically transmitting data at a very high data signaling rate with very short transmission times. The data is transmitted in bursts, which are discrete units. The ring configuration of network 10 permits any node 12 to communicate data to/from any other node 12 in network 10. Node 12 acts as a source node 12 when it communicates data. Node 12 acts as a receiving node 12 when it receives data from a source node 12. Nodes 12 that exist between the source node 12 and the receiving node 12 are received to as intermediate nodes 12. Intermediate nodes 12 forward data from source node 12 to the intended receiving node 12 without processing the data. For example, as to adjacent nodes 12, data may be communicated directly. As to nonadjacent nodes 12, data is communicated by way of one or more intermediate nodes 12. For example, node 12a may communicate data directly to adjacent nodes 12b and 12e, but node 12a communicates data to nonadjacent node 12d by way of intermediate nodes 12b and 12c or by way of 12e. Nodes 12 may operate as a source node, a receiving node, an intermediate node, or any combination of the preceding.

Nodes 12 may communicate data in any suitable transport technique, such as point-to-point transmission or point-to-multipoint transmission. For example, point-to-point transmission may include communicating data from one node 12 in network 10 to another node 12 in network 10. As another example, point-to-multipoint transmission (i.e. multicast transmission) may include communicating data from one node 12 in network 10 to multiple nodes 12 in network 10. For example, node 12a may transmit data to nodes 12b, 12c, and 12e using point-to-multipoint transmission. In this example, node 12a behaves as a root node and nodes 12b, 12c, and 12e behave as branch nodes. A root node is the originator of the multicast transmission, and multiple branch nodes are the recipients of the multicast transmission.

Node 12 may be configured to communicate data using any suitable wavelength. As an example only, node 12a may communicate data using $\lambda_1$ and $\lambda_2$, node 12b may communicate data using $\lambda_3$, and node 12c may communicate data using $\lambda_4$ and $\lambda_5$. Furthermore, nodes 12 may receive traffic from other nodes 12 on the same wavelength(s) that they use to transmit traffic or on a different wavelength(s). Node 12 may also provide fault tolerance in the event of a transmission failure, such as node 12 failing or fiber 16 being cut. Node 12 may have back-up components that take over during the transmission failure and allow for normal operation to continue.

Nodes 12 may be coupled to data sources 14. Data sources 14 provide data to network 10 or receive data from network 10. Data source 14 may be a Local Area Network (LAN), a Wide Area Network (WAN), or any other type of device or network that may send or receive data.

Nodes 12 are coupled to one another by one or more optical fibers 16. Fibers 16 transmit optical signals between nodes 12. Fibers 16 may be a single unidirectional fiber, a single bi-directional fiber, or a plurality of uni- or bi-directional fibers. As illustrated, network 10 includes two uni-directional fibers 16a and 16b. Data transmitted counterclockwise on network 10 is carried on fiber 16a, while data transmitted clockwise on network 10 is carried on fiber 16b. Fibers 16 may be made of material capable of transmitting optical signals having multiple wavelengths.

Nodes 12 are also coupled to one another by a control channel 18. Control channel 18 may be an optical channel or any other type of channel suitable to communicate control messages between adjacent nodes 12. For example, control channel 18 may be a separate wavelength, referred to as an optical supervisory channel (OSC), communicated over fibers 16a and 16b when network 10 utilizes WDM. In particular embodiments, control channel 18 may be a Generalized Multi-protocol Label Switching (GMPLS) based channel. Label Switched Paths (LSPs) are established by GMPLS control channel signaling, which creates virtual tunnels that optical bursts follow.

Control messages control the operation of data transmissions on network 10 and provide for efficient use of resources among the nodes 12 in network 10. According to particular embodiments, control messages may be processed at every node 12, while data transmissions may pass intermediate nodes 12 without electronic processing.

As described in further detail below, nodes 12 may use information from control messages to implement a predictive scheduling technique of data control channel 18. For example, node 12b may use a control message to determine when it will receive a token to authorize transmission of data. Nodes 12 wait to receive a token before transmitting data on network 10. Tokens provide coordination among nodes 12 so as to avoid contention on network 10. Tokens include any suitable communication received by a node 12 that authorizes that node 12 to transmit data on network 10. In particular embodiments, node 12 may predict when it will receive a token. The predictability of token arrival order is useful to optimize control channel 18 and actual data movement. By applying the predictive scheduling technique, as described in FIGS. 6 and 7, to all existing tokens circulating on network 10, each node 12 is able to schedule its data transmission operations with sufficient accuracy such that node 12 may quickly transmit data when the expected token arrives at node 12.

In particular embodiments, network 10 also includes policy server 20, which represents any suitable storage element that supports distributed, parallel token dynamics in control channel 18. In such embodiments, a central controller does not dictate token movement, but token movement is controlled at each node 12 by a set of policies provided by policy server 20. Policy server 20 defines and deploys token control policies to individual nodes 12 using any suitable protocol, such as Lightweight Directory Access Protocol (LDAP) or Common Open Policy Service (COPS) protocol. Control channel 18 enforces the policies to tokens passing node 12, such as adjusting the tokens departure time according to the policies. Policy server 20 may adjust the characteristics of data transmission over network 10 with the policies.

Figure 6:
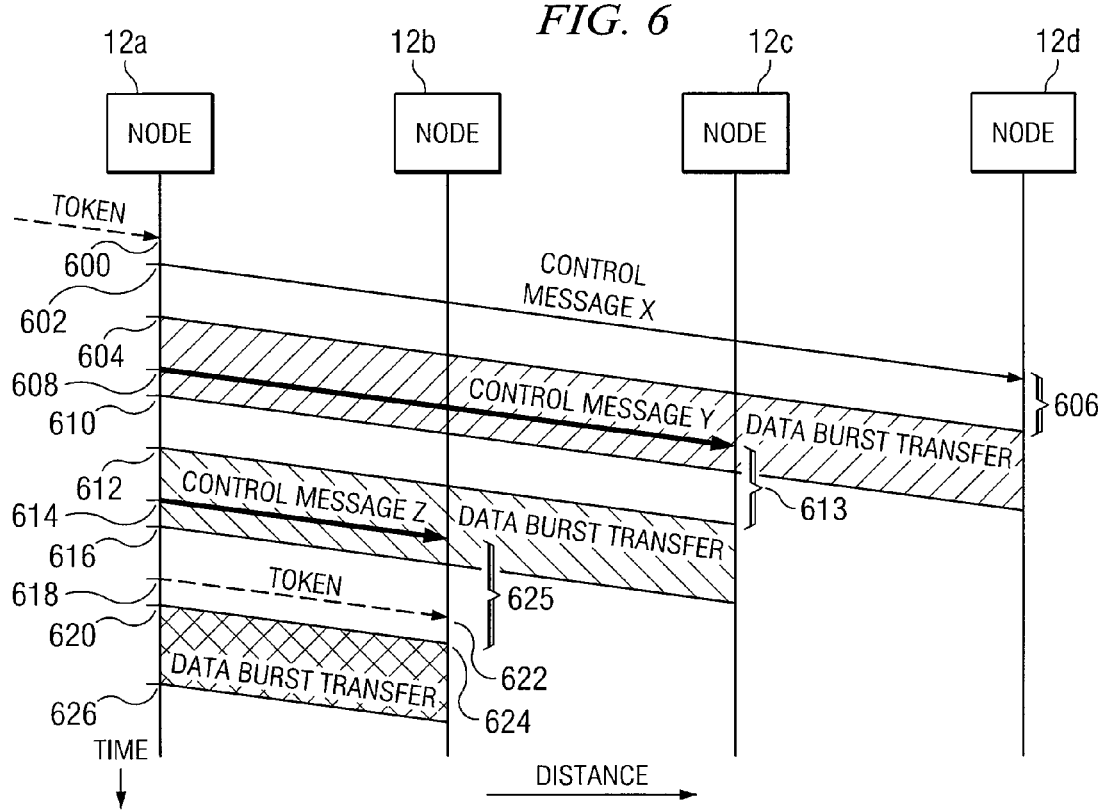
FIG. 6 is a diagram illustrating predictive scheduling of data channel control.

As discussed in further detail in reference to FIG. 6, policy server 20 may use any suitable policy to facilitate token movement. The policies interact with each other to provide for efficient and fair transmissions among nodes 12. A resolution mechanism may be used with the policies to provide some solution if the policies lead to conflicting token operation.

Modifications, additions, or omissions may be made to network 10. Any suitable logic comprising software, hardware, other logic, or any suitable combination of the preceding may perform the functions of any component in system 10.

Figure 2:
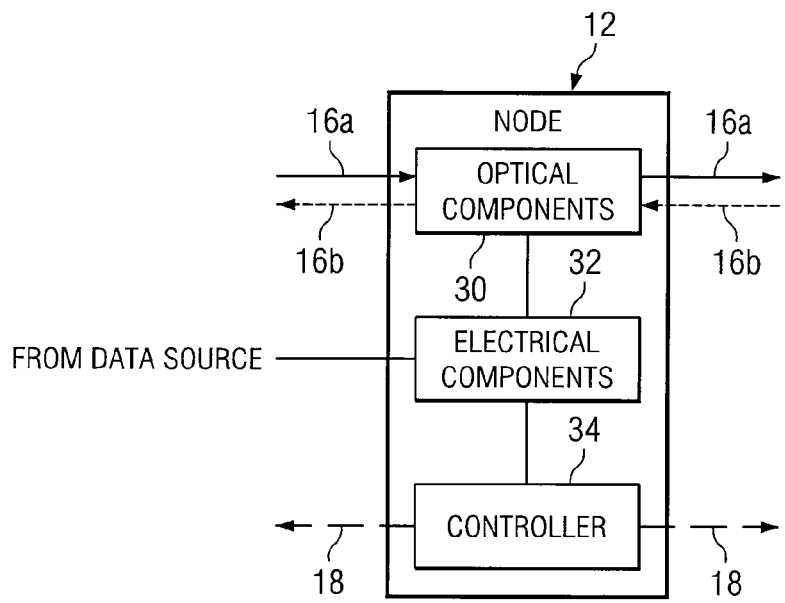
FIG. 2 is a block diagram illustrating functional elements of a network node from the network.

FIG. 2 is a block diagram illustrating functional elements of network node 12 from network 10. Node 12 includes optical components 30, electrical components 32, and a controller 34. Optical components 30 couple to fiber 16, and electrical components 32 couple to optical components 30. Controller 34 couples to electrical components 32 and optical components 30, as well as control channel 18.

Optical components 30 receive, pass, and transmit optical signals associated with data on optical network 10, while electrical components 32 receive data from or transmit data to optical components 30 and data sources 14. For example, optical components 30 implement add-drop multiplexing functionality for sending traffic to and receiving traffic from network 10, and electrical components 32 provide data aggregation and queue management for burst transmission of traffic via optical components. Controller 34 controls optical components 30 and electrical components 32 and may communicate tokens and control messages using control channel 18. In particular embodiments, control channel 18 is an optical wavelength, which provides for controller 34 sending and receiving messages via optical components 30.

In particular embodiments, node 12 provides at least three modes of operation: a transmit mode, a pass-through mode, and a receive mode. In transmit mode, node 12 may operate to transmit data on network 10. In pass-through mode, node 12 may operate to allow data to pass through node 12 without electronic processing. In receive mode, node 12 may operate to receive data from network 10. Any particular node 12 may operate in any mode or in multiple modes at any point in time.

In the transmit mode, node 12 waits until it receives a token authorizing data transmission using a wavelength. When a token is received, controller 34 determines whether data is available to be transmitted. If data is available, controller 34 may prepare and communicate a control message to the next adjacent node 12 indicating any suitable information, such as one or more of the following: the destination of the data, the data channel, the size of the data transmission, and/or timing of the data transmission. After communicating the control message, controller 34 may control optical components 30 and electrical components 32 to transmit the data over network 10 according to the parameters specified in the control message.

In the pass-through mode, node 12 receives a control message that neither includes a token nor indicates node 12 is a destination of the data with which the control message is associated. Controller 34 may forward the control message to the next adjacent node 12 and allow data to pass through node 12 without electronic processing. In other words, optical components 30 may simply pass the data to the next adjacent node 12 without electronic processing by electrical components 32.

In the receive mode, node 12 receives a control message indicating that it is a destination of the data with which the control message is associated. In this situation, controller 34 may control optical components 30 and electrical components 32 to receive data over network 10 according to parameters specified in the control message.

Figure 3A:
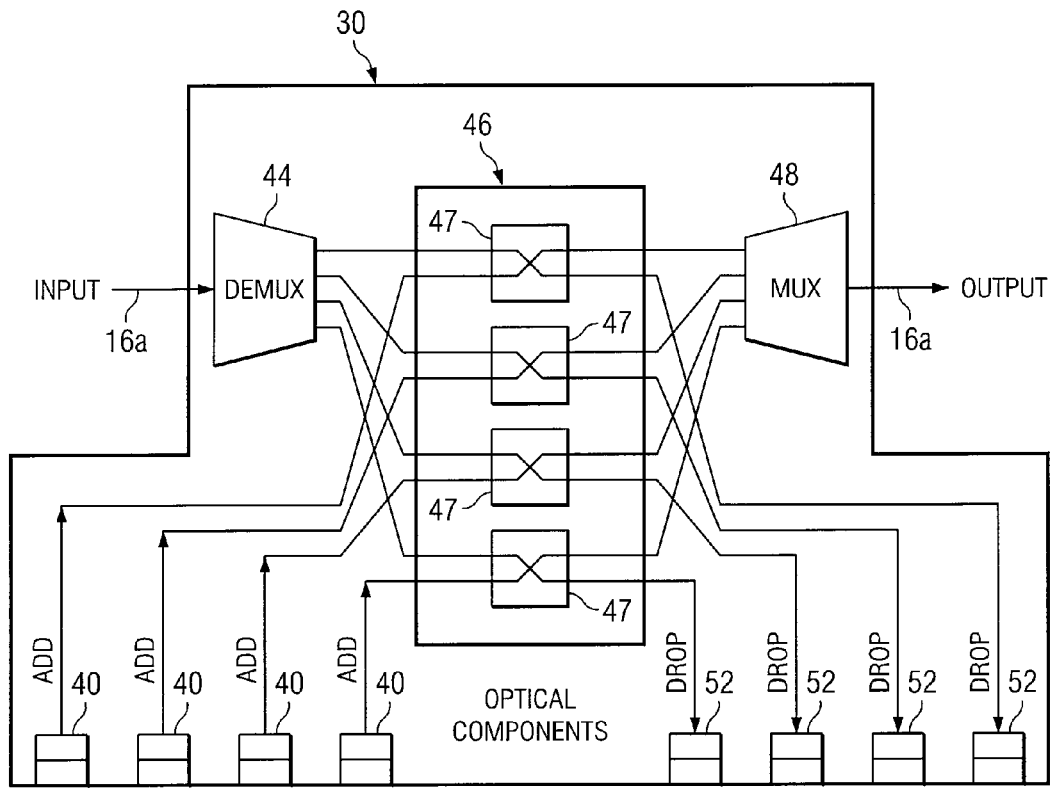
FIG. 3A is a block diagram illustrating optical components of the network node.
Figure 5A:
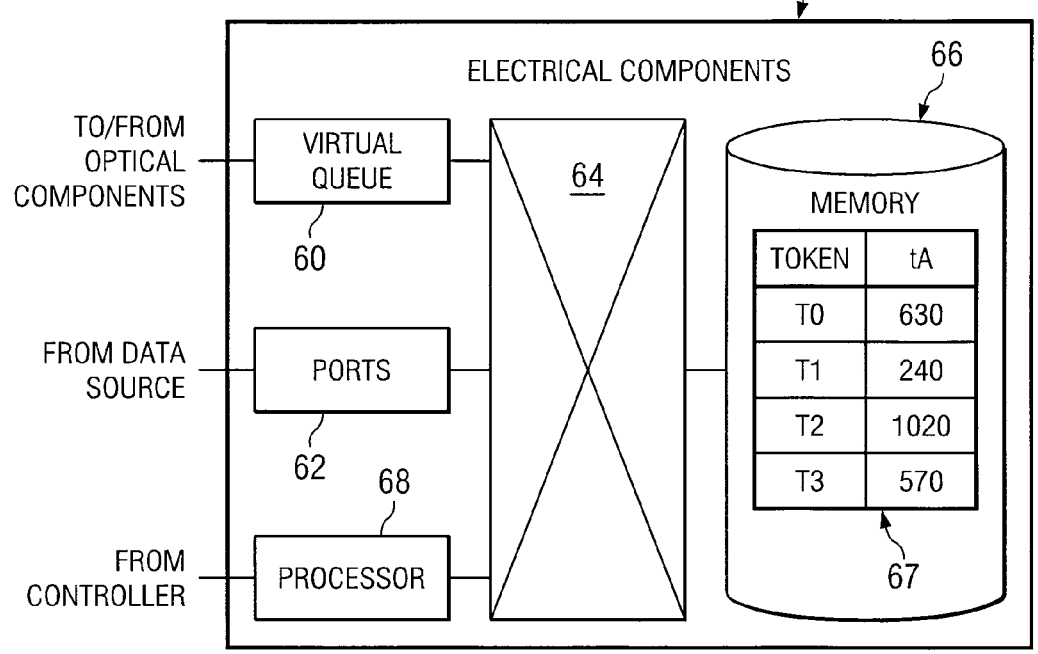
FIG. 5A is a block diagram illustrating electrical components of the network node.
Figure 5B:
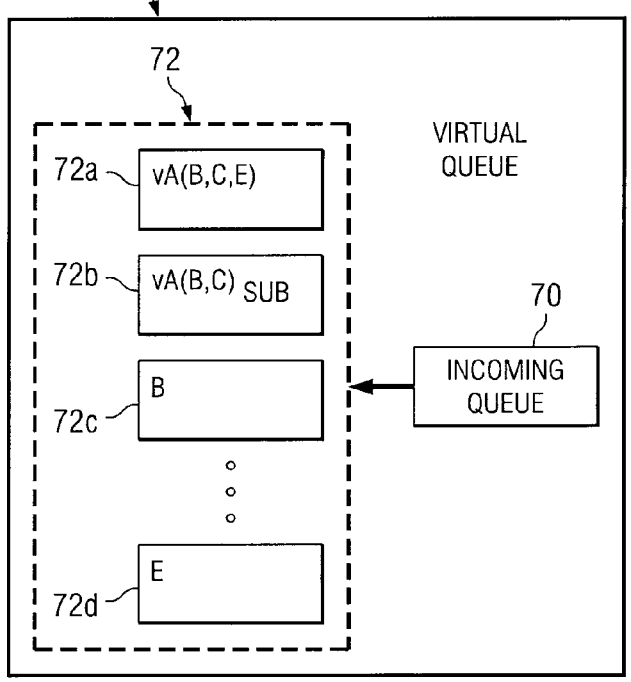
FIG. 5B is a block diagram illustrating a virtual queue in the electrical components.

Optical components 30 and their operation in these modes are discussed in relation to FIG. 3A, and electrical components and their operation in these modes are discussed in relation to FIGS. 5A and 5B.

FIG. 3A is a block diagram illustrating optical components 30 of network node 12. According to particular embodiments, optical components 30 may operate to receive and/or transmit optical signals on network 10. In the illustrated embodiment, optical components 30 receive and/or transmit optical signals using fiber 16a. More specifically, optical components 30 provide for receiving data bursts destined for node 12 and for sending data bursts from node 12. In the illustrated embodiment, node 12 includes optical components 30, such as a transmitter 40, demultiplexers 44, a switching matrix 46, multiplexers 48, and a receiver 52.

Transmitter 40 represents any suitable device operable to transmit optical signals. For example, transmitter 40 receives electrical signals from electrical components 32 and generates corresponding optical signals and communicates these signals. In the illustrated embodiment, the optical signal is in a particular wavelength, and transmitter 40 communicates the optical signal directly to switching matrix 46. In the illustrated embodiment, optical node 12 has several transmitters 40 to handle optical signals of different wavelengths.

Receiver 52 represents any suitable device operable to receive optical signals. For example, receiver 52 receives optical signals, converts these received optical signals to corresponding electrical signals, and forwards these electrical signals to electrical components 32. In the illustrated embodiment, receiver 52, receives the optical signal of a particular wavelength directly from switching matrix 46. In the illustrated embodiment, optical node 12 has several receivers 52 to handle optical signals of different wavelengths.

In other embodiments, transmitter 40 and receiver 52 may be combined into one or more optical burst transponders. Transponders represent any suitable device operable to transmit and receive optical signals. The transponder may be responsible for a waveband that comprises multiple wavelengths.

Demultiplexer 44 represents any suitable device operable to separate a single signal into two or more signals. As an example only, demultiplexer 44 may use arrayed waveguide grating (AWG) to demultiplex the signal. Demultiplexer 44 may include any suitable input port and any suitable number of output ports. In the illustrated embodiment, demultiplexer 44 includes an input port that receives an input WDM signal from fiber 16a. In this example, demultiplexer 44 separates the WDM signal into signals of the different constituent wavelengths of the WDM signal. Node 12 may include any suitable number of demultiplexers to handle additional inputs of WDM signals.

Multiplexer 48 represents any suitable device operable to combine two or more signals for transmission as a single signal. Multiplexer 48 may use an AWG to multiplex signals in different wavelengths into a single WDM signal. Multiplexer 48 may include any suitable number of input ports and any suitable output port. In the illustrated embodiment, multiplexer 48 includes an output port coupled to fiber 16a. For example, multiplexer 48 combines the signals received from switch 46 into a single signal for transmission on fiber 16a from the output port. Node 12 may include any suitable number of multiplexers to handle additional outputs of WDM signals.

Switching matrix 46 represents any suitable switching device operable to switch signals. For example, switching matrix 46 switches signals between outputs of demultiplexer 44 and inputs of multiplexer 48. In particular embodiments, switching matrix 46 includes one or more electro-optic switches (EO switches) 47 that attain switching speeds of several nanoseconds. Each EO switch 47 individually switches a wavelength on or off to be outputted onto fiber 16a or to be dropped to receiver 52. For example, each EO switch 47 may receive an output signal from demultiplexer 44 or transmitters 40 and switch such signal(s) to multiplexer 48 or receivers 52. Each EO switch 47 may receive any suitable number of inputs and any suitable number of outputs. For example, EO switch 47 may be a 1×2 switch, a 2×2 switch, or a 4×4 switch. EO switch 47 may be available off-the-shelf from any suitable vendor, such as Nozomi Photonics, which sells AlacerSwitch 0202Q. Each input and output on the EO switch 47 handles a particular wavelength. An electrical gate in the EO switch 47 may control the output direction of the signal. In an embodiment when EO switch 47 is a 4×4 switch, multiple wavelengths may be received, dropped, added, or passed through. For example, each 4×4 switch may receive two wavelengths, add two wavelengths, pass through two wavelengths, and drop two wavelengths. As another example, each 4×4 switch may receive and pass through more wavelengths than the 4×4 switch adds and drops.

Switching matrix 46 provides for either dropping the signal to receiver 52 or passing the signal onto network 10. Because the signal may be dropped at destination node 12 without having to traverse the entire communication ring, concurrent data transmission may be provisioned on non-overlapping segments of the ring. This spatial re-use is supported by multi-token operation.

Multi-token operation supports the spatial reuse of the communication ring. Multi-token operation virtually segments the ring to support simultaneous transmissions. Therefore, multiple secondary short distance data transmissions are allowed if the transmissions do not overlap with each other and the primary transmission.

Optical components 30 may be fabricated using any suitable technique. For example, demultiplexers 44, switching matrix 46, and multiplexers 48 may be fabricated on a single substrate. The integrated devices may be fabricated on a wafer level with passive alignment of EO switch 47 chips to the waveguides of the substrate. The passive waveguides can be formed on silicon substrates, which enables compact integration of logic, waveguides, and switches into a single module. As another example, demultiplexers 44, switching matrix 46, and multiplexers 48 may be fabricated separately and assembled into optical components 30. Assembly following fabrication of the separate components involves active alignment techniques.

Modifications, additions, or omissions may be made to optical components 30. For example, any suitable combination of components may perform the functionality of optical components 30. A wavelength selection switch (WSS) may receive the main input from fiber 16a and provide inputs to switching matrix 46, which replaces demultiplexer 44a. A coupler may receive outputs from switching matrix 46 and provide the main output onto fiber 16a, which replaces multiplexer 48a. As another example, if a single wavelength is added or dropped, demultiplexer 44b and multiplexer 48b, respectively, are not needed. The added or dropped wavelength may be directly inputted into switching matrix 46. As yet another example, node 12 may include a second set of optical components 30 to provide for fault tolerance. The second set of optical components 30 provides a fail-over if a transmission failure occurs. Any suitable logic comprising software, hardware, other logic, or any suitable combination of the preceding may perform the functions of any component in optical components 30. Also, while FIG. 3A illustrates components corresponding to transmissions using fiber 16a, similar or different optical components may be used in conjunction with transmissions over fiber 16b or any suitable fiber.

Figure 3B:
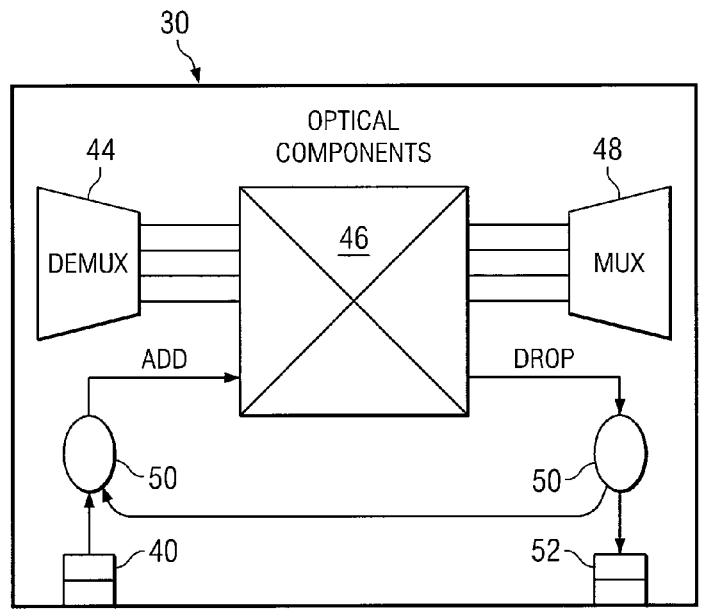
FIG. 3B is a block diagram illustrating a configuration of the optical components of the network node implementing a drop and continue technique.

FIG. 3B is a block diagram illustrating a configuration of optical components 30 of network node 12 implementing a drop and continue technique. Because the traffic in one or more wavelengths may be dropped by switching matrix 46 at node 12 and completely removed from the ring, one or more of the dropped wavelengths may be added back to the ring to support the multicast transmission. The re-transmission may be achieved using optical components 30 or using electrical components 32. When the retransmission occurs in optical components 30 ("drop and continue"), the dropped signal is retransmitted through switching matrix 46 again and then switched to multiplexer 48a, which provides the data to fiber 16a. For example, a signal is dropped from switching matrix 46 to coupler 50. Coupler 50 is any suitable element that may split an optical signal into two or more copies, each having similar or different power levels. In the illustrated embodiment, coupler 50 splits the dropped signal and communicates one copy of the signal to receiver 52 and the other copy of the signal to another coupler 50 or any other suitable device to combine the copy with add traffic, if any, from transmitter 40. The signal is then forwarded to switching matrix 46, which switches the signal to multiplexer 48a, and the signal is outputted from node 12 to fiber 16a. The retransmission completely occurs in optical elements 30. There is no optical-electrical-optical conversion involved in retransmitting the multicast data transmission in optical components 30.

Figure 3C:
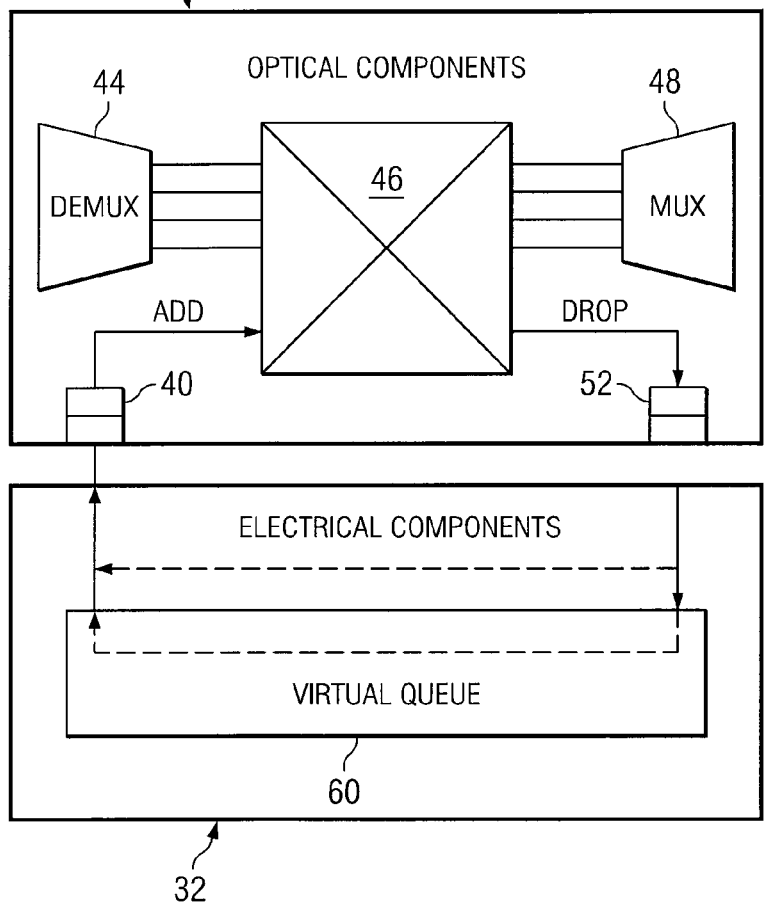
FIG. 3C is a block diagram illustrating a configuration of the optical components of the network node implementing a drop and regenerate technique.

FIG. 3C is a block diagram illustrating a configuration of optical components 30 of network node 12 implementing a drop and regenerate technique. If the retransmission occurs in electrical components 32 ("drop and regenerate"), the dropped signal is converted to an electric signal and duplicated. The duplicated signal is communicated to transmitter 40, transmitter 40 converts the duplicated electrical signal to an optical signal, and forwards the signal to switching matrix 46. Switching matrix 46 switches the signal to multiplexer 48a, and the signal is outputted from node 12 to fiber 16a. Duplicating and retransmitting the signal completely regenerates the signal and produces a better quality signal. The duplicated signal also may be buffered in virtual output queue 60 before being forwarded to transmitter 40. This may occur in point-to-multipoint communications, as discussed below. Furthermore, the retransmitted signal may be transmitted on a different wavelength than the one on which it was received.

Figure 4:
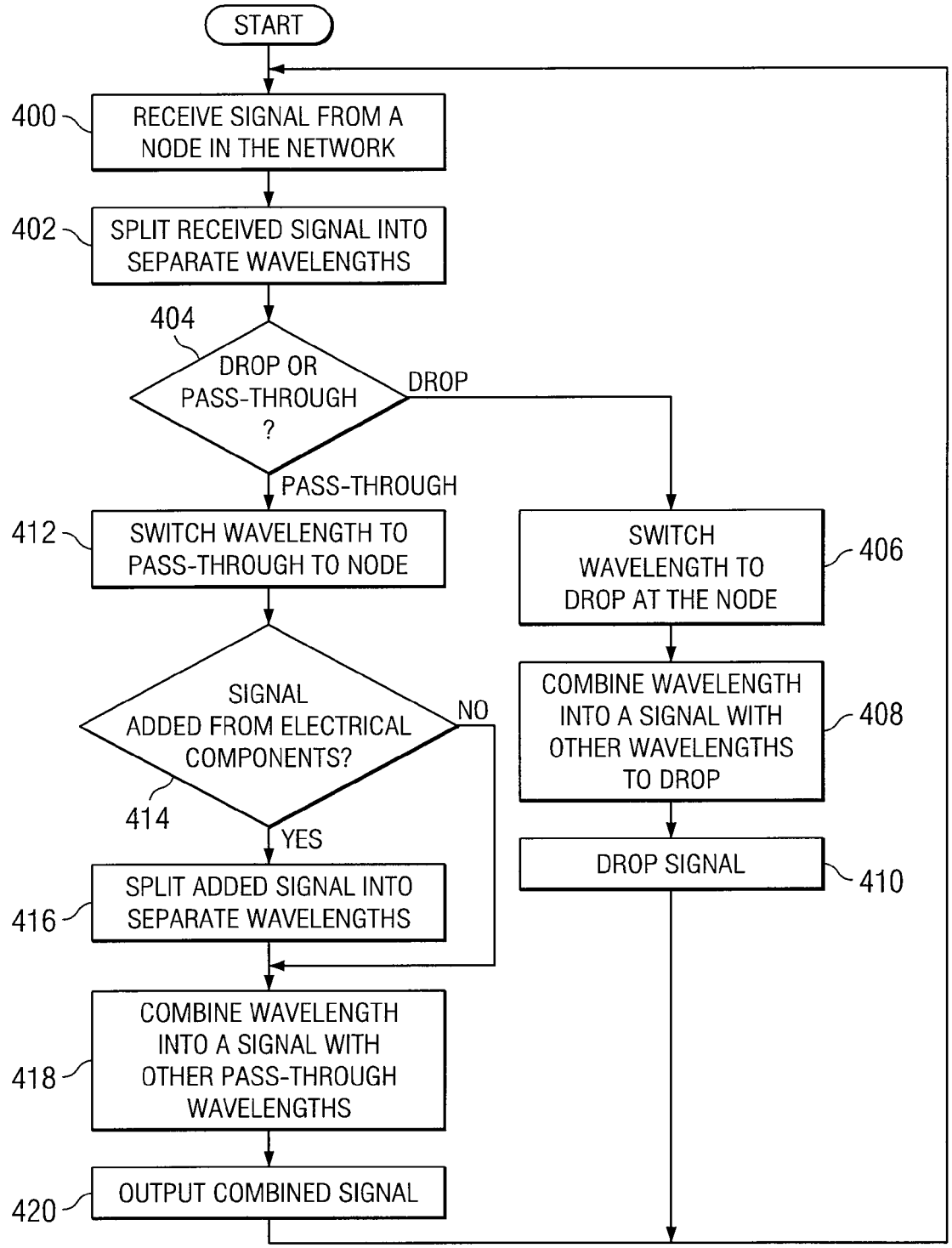
FIG. 4 is a flowchart illustrating a method for communicating data using the network node.

FIG. 4 is a flowchart illustrating a method for communicating data using network node 12. This flowchart contemplates data transmission occurring around the communication ring. More specifically, the flowchart reflects the operation of optical components 30 during communication.

At step 400, node 12 receives a signal from a transmitting node 12 in network 10. The signal arrives at node 12 on a fiber 16. At step 402, the signal received from network 10 is split into separate wavelengths. For example, demultiplexer 44a separates the signal received from network 10.

As discussed above, switching matrix 46 is configured such that it switches each constituent wavelength of the input signal to either an output of the node (pass-through) or to electrical components 32 of the node (drop). Step 404 indicates this separate configuration for each wavelength (the node 12 does not need to make any decision at this step). For each wavelength, if node 12 is configured to receive the wavelength, the method continues from step 406, and if node 12 is not configured to receive the wavelength, the method continues from step 412.

Following the path at step 406, optical components 30 switch the wavelength to drop the particular wavelength at node 12. For example, switching matrix 46 switches the signals in the wavelength to multiplexer 48b. At step 408, multiplexer 48b combines the signals to be dropped at node 12. Multiplexer 48b drops the combined signal at step 410 to electrical components 32.

If node 12 is not configured to receive a particular wavelength, switching matrix 46 switches the wavelength to pass through node 12 at step 412. For example, switching matrix 46 switches the signals in the wavelength to multiplexer 48a. If a signal is to be added to the ring by optical components 30 (i.e. a signal received from data source 14 via electrical components 32) as determined at step 414, optical components 30 split the add signal into separate wavelengths at step 416. For example, optical components 30 include demultiplexer 44b to separate the added signal. At step 418, multiplexer 48a combines the pass-through wavelength with other wavelengths to be passed through node 12 and with wavelengths added at the node 12. Multiplexer 48 outputs the combined signal from node 12 on fiber 16 at step 420.

The method continually is being performed because signals are constantly being received at node 12.

Modifications, additions, or omissions may be made to the flowchart in FIG. 4. For example, a single wavelength or multiple wavelengths can be received, added, dropped, or passed through by optical components 30. The flowchart in FIG. 4 may include more, fewer, or other steps. Additionally, steps may be performed in any suitable order and by any suitable component.

FIG. 5A is a block diagram illustrating electrical components 32 of network node 12. Electrical components 32 include virtual queue 60, ports 62, a switch 64, memory 66, and a processor 68. In operation, electrical components 32 may aggregate outgoing local data, de-aggregate incoming network data, and store data for later transmission. Switch 64 selectively connects virtual queue 60, ports 62, memory 66, and processor 68.

Virtual queue 60 provides for de-aggregation and temporary buffering of network data received from optical components 30 for transmission to data source 14, and for aggregation and temporary buffering of data from data source 14 for transmission over network 10. Virtual queue 60 will be discussed further with respect to FIG. 5B. Ports 62 are one or more connections permitting communications with data sources 14. Ports 62 may operate to couple electrical components 32 to data source 14 so that local data received from data source 14 or network data transmitted to data source 14 flows through ports 62.

Memory 66 stores, either permanently or temporarily, data and other information for processing by processor 68. Memory 66 may store data for transmission to other nodes 12, data received from other nodes 12, routings for use by processor 68, or other suitable information. Memory 66 also provides for fault management. For example, an intermediate node 12 along a data transmission path may store a copy of a data transmission as the transmission passes through the intermediate node 12. In this manner, data may be recovered when a transmission does not reach its intended destination node 12. Memory 66 represents any one or combination of volatile or non-volatile local or remote devices suitable for storing information. For example, memory 66 may be a random access memory (RAM) device, a read only memory (ROM) device, a magnetic storage device, an optical storage device, or any other suitable information storage device or combination of these devices. Also, memory 66 may have large storage capacity to enable node 12 to store and transmit large amounts of data.

In the illustrated embodiment, memory 66 includes a scheduling table 67 that tracks the predicted token arrival time of a token at node 12. When using the predictive scheduling technique, as described below, scheduling table 67 includes information about future token arrival time. For example, scheduling table 67 includes each token within network 10 and the associated predicted arrival time of each token in microseconds. Each entry for the token is incrementally updated when new information on the current status is obtained. Scheduling table 67 represents any suitable storage mechanism that provides for updating the stored information.

Processor 68 controls the operation and administration of switch 64 as well as other electrical components 32. Thus, in operation, processor 68 controls switch 64 to direct data into and out of virtual queue 60, ports 62, and memory 66. For example, processor 68 may direct network data received from optical components 30 via virtual queue 60 to be stored in memory 66 and may direct local data received through ports 62 to be aggregated for communication from virtual queue 60 to optical components 30. Processor 68 includes any hardware operable to control and process information. For example, processor 68 may be a microcontroller, a microprocessor, a programmable logic device, and/or any other suitable processing device. In particular embodiments, processor 68 and controller 34 may share or be the same hardware.

Modifications, additions, or omissions may be made to electrical components 32. As another example, any suitable component may provide the functionality of another component. Any suitable logic comprising software, hardware, other logic, or any suitable combination of the preceding may perform the functions of any component in electrical components 32.

FIG. 5B is a block diagram illustrating virtual queue 60 in further detail. Virtual queue 60 facilitates data aggregation and transmission in node 12. Virtual queues 60 may include any suitable structure, such as structures in memory 66 or memory structures separate from memory 66. A data burst is a collection of data for transmission over network 10. Larger bursts may improve the performance of network 10. This is because each data transmission may be associated with a control message, which is processed at every node 12, and the data transmissions may include headers to synchronize clocks at destination nodes 12. Processing control messages and headers creates overhead, which can be reduced by increasing the size of bursts using data aggregation. For example, multiple packets of data may be combined into one burst, thereby reducing the number of control messages and headers communicated over network 10.

Virtual queue 60 includes incoming queue 70 and a plurality of outgoing queues 72. Incoming queue 70 buffers data that node 12 receives. Outgoing queues 72 buffer data waiting for transmission by node 12. Incoming queue 70 and outgoing queues 72 may organize the data using any suitable technique or combination of techniques. For example, incoming queue 70 and outgoing queues 72 organize the data by destination. In this example, outgoing queues 72 are each associated with a particular destination(s).

Outgoing queues 72 may also be associated with a particular wavelength. The outgoing queues 72 associated with the particular wavelength may also be organized separately according to destination. In the illustrated embodiment, outgoing queues 72 transmit data on a particular wavelength and are separated according to the destination. In this embodiment, node 12 receives a token that authorizes it to begin transmission on the particular wavelength. Therefore, node 12 transmits data from the outgoing queues 72 that transmit data on that particular wavelength. In other embodiments, virtual queue 60 includes additional outgoing queues 72 that transmit data on multiple other wavelengths.

A transmission allocation, as included in the token that authorizes transmission, provides the time period in which node 12 may communicate data over a particular wavelength (data channel). Once the period of time ends, node 12 ceases transmission on that wavelength. For example, if outgoing queue 72a is associated with traffic transmitted on $\lambda_1$ when a token arrives at node 12 authorizing transmission on $\lambda_1$, data may be transmitted from outgoing queue 72a in the form of bursts to the destinations associated with outgoing queue 72a using $\lambda_1$. But the bursts only may be transmitted for a time period that is limited by the transmission allocation for the particular wavelength. The transmission allocations may be different for each wavelength.

Destination allocations represent proportions of the total transmission allocation that may be utilized to transmit data bursts to particular destinations. For example, when a token arrives at root node 12 authorizing transmission, bursts may be transmitted from outgoing queues 72 according to a destination allocation. The proportions may be predetermined to allow for fair distribution or guaranteed bandwidth among destinations. The following proportions might be specified by the destination allocation: ⅓ of the transmission allocation to destination multicast group (B,C,E); ⅓ to destination multicast group (B,C); ⅙ to destination B; and ⅙ to destination E. For example, Weighted Fair Queuing (WFQ), which will be discussed in more detail with respect to FIGS. 8A and 8B, may be applied by outgoing queues 72 to determine the proportions. Note that any combination of various proportions may be used. Furthermore, destination allocations may be the same or different for each data channel.

Topology information may be used to calculate destination allocations across multiple data channels. Topology information includes any information related to the topology of network 10. For example, topology information may include the number of nodes 12 on network 10, the time to transmit data and the control messages through segments of network 10, the time nodes 12 take to process the control messages and tokens, and any other suitable information.

Incoming queue 70 organizes local data that node 12 receives from data source 14 or from other nodes 12 in network 10. In this manner, incoming queue 70 acts as a temporary queue.

In the illustrated embodiment, outgoing queues 72 are organized by destination and organized according to the type of transmission. For example, outgoing queues 72a and 72b facilitate point-to-multipoint data transmission, and outgoing queues 72c and 72d facilitate point-to-point transmission. For example, outgoing queue 72a facilitates data transmission from node 12a to nodes 12b, 12c, and 12e. Outgoing queue 72a temporarily holds data when node 12a acts as a root node 12 in a multicast transmission. The header of outgoing queue 72a, vA(B,C,E), may represent which branch nodes 12 will receive the multicast transmission.

Outgoing queue 72b facilitates data transmission from node 12a to nodes 12b and 12c. In the illustrated embodiment, outgoing queue 72b temporarily holds data when node 12a acts as a branch node 12 in a multicast transmission. In this example, node 12a has received data from a root node 12 and communicates the data to other branch nodes 12 in the multicast transmission. The header of outgoing queue 72b, vA(B,C)sub, may represent which additional branch nodes 12 will receive the multicast transmission.

In the illustrated embodiment, outgoing queue 72c includes data destined for node 12b, and outgoing queue 72d includes data destined for node 12e. In this example, the header of outgoing queues 72c and 72d represent that the transmission is point-to-point. The header of outgoing queue 72c includes node 12b, as the receiving node, and the header of outgoing queue 72d includes node 12e as the receiving node. In an embodiment, outgoing queues 72 are created when data is available to transmit from incoming queue 70.

In particular embodiments, nodes 12 may utilize a predictive scheduling algorithm to facilitate transmission from outgoing queues 72. The predictive scheduling algorithm allows node 12 to predict when it will receive a token that allows it to begin data transmission. Establishing output queues 72 provides for node 12 effectively using the predictive scheduling algorithm. Data is queued in outgoing queues 72 for delivery on a particular wavelength before the token that authorizes the transmission arrives.

The predictive scheduling algorithm may reduce the maximum amount of time each node 12 waits to access network 10 to transmit data. This may allow network 10 to support and ensure a minimum quality of service level for time-sensitive traffic, such as real-time traffic. Furthermore, the algorithm may ensure that access to network 10 is appropriately allocated among nodes 12. For example, nodes 12 may have differing weights to support heavily utilized nodes 12 as well as respond to dynamically changing traffic requirements. The algorithm may also decrease contention at destination nodes 12.

Modifications, additions, or omissions may be made to virtual queue 60. For example, virtual queue 60 may include an outgoing queue 72 for each possible destination node 12 and each possible combination of destination nodes 12 for multipoint transmissions upon initial configuration of node 12. As another example, outgoing queues 72 may exist for any suitable period of time. In a multicast operation, outgoing queues 72 may be deleted after use by tearing down the point-to-multipoint label switched path, which removes the reservations for the multicast transmission path.

FIG. 6 is a diagram illustrating predictive scheduling of data channel control. The diagram shows data transmissions occurring on a particular data channel used to transmit data from node 12a to nodes 12b, 12c, and 12d. Similar operations would occur on each data channel. The vertical axis represents time and the horizontal axis represents distance around the network 10 along a fiber 16. Thus, the diagram illustrates the transfer of data over time between nodes 12 using predictive scheduling.

Control messages X, Y, and Z include information on the current position of the token, and the prospective departure time of the token from node 12a (time 618). As discussed with reference to FIG. 1, by interpreting the information on tokens using policy rules that dictate token dynamics, controllers 34 at nodes 12b, 12c, and 12d are able to predict the token arrival time at node 12b (time 622). Similarly, this process can be repeated for each node 12 that has the token to determine when the next node 12 will receive the token.

Policy rules include any suitable policy, such as a speed policy, a distance policy, or a timing policy. Using the speed policy, the number of primary tokens is the same as the number of wavelengths used for transmission. The distance policy provides for keeping some distance between two adjacent tokens in the same waveband group. The timing policy provides for the longest time any token may remain at node 12. A token cannot stay at the same node 12 for an indefinite period of time.

These policies interact with each other, and a resolution mechanism is implemented if two policies lead to conflicting token operation. For example, if tokens are waiting at a node 12, the timing policy may be in effect and the tokens have to leave within a time limit. However, if burst transmission initiated by the token is unsuccessful, it becomes necessary to determine whether the token leaves the node 12 or remains at the node 12 until the transmission succeeds. As another example, for the distance policy, an objective is to avoid two tokens synchronizing in such a way that they depart a node 12 simultaneously. In an embodiment, the distance policy may add small randomness to token departure time so the synchronization is broken and even access to tokens is granted.

Node 12a receives the token at time 600. Between times 600 and 602, node 12a determines it has data available to send and builds a control message to reflect the upcoming data transmission. As discussed in FIG. 1, the control message includes information that nodes 12 may use to predict when it will receive a token and be authorized to transmit data. In the illustrated embodiment, node 12a communicates control message X to node 12d at time 602. In other embodiments, any node 12 may act as the sending node and any node 12 may act as the receiving node. Next, node 12a configures itself to transmit data. Node 12a may wait for a period of time to allow node 12d to configure itself to receive the data. At time 604, node 12a begins data transmission to node 12d, which continues until time 610. Guard time 606 represents the time between node 12d receiving control message X and receiving the data burst transfer.

While node 12a transmits data to node 12d, node 12a builds and sends a control message Y to node 12c that reflects the upcoming data transmission. Node 12a waits for a period of time to allow node 12c to configure itself to receive the data. At time 612, node 12a begins data transmission to node 12c, which continues until 616. Guard time 613 represents the time between node 12c receiving control message Y and receiving the data burst transfer.

While node 12a transmits data to node 12c, node 12a builds and sends a control message Z to node 12b that reflects the upcoming data transmission and the upcoming token transmission at time 614. By receiving this information, node 12b can configure its outgoing queues 72 to prepare to transmit data more quickly. Node 12a waits for a period of time to allow node 12b to configure itself to receive the data. Node 12a sends a token at time 618 to node 12b authorizing node 12b to begin data transmission. Node 12a begins data transmission to node 12b at time 620. Node 12b receives the token at time 622 and receives the initial data transmission at time 624. Guard time 625 represents the time between node 12b receiving control message X and receiving the data burst transfer. Node 12a continues the data transmission until time 626.

This flow of information between nodes 12 allows for the computation of the arrival time of a token. Since the control message contains a fairly accurate prediction of token departure from node 12a, the arrival time of the token at node 12b may be obtained by adding the expected token traveling time between nodes 12a and 12b. With the token arrival prediction algorithm in place at each node 12, an optical burst transport data path control unit is able to tell which burst transponder is to fire and the timing of the firing. Therefore, the data path operation of electrical components 32 is scheduled and optimized so the assembling of respective bursts is complete when a token arrives at node 12.

Modifications, additions, or omissions may be made to the diagram in FIG. 6. For example, any suitable number of nodes 12 may exist in network 10, and any suitable node 12 may act as the receiver or transmitter. As another example, a single data burst transfer may occur between nodes 12 rather than multiple data burst transfers.

Figure 7:
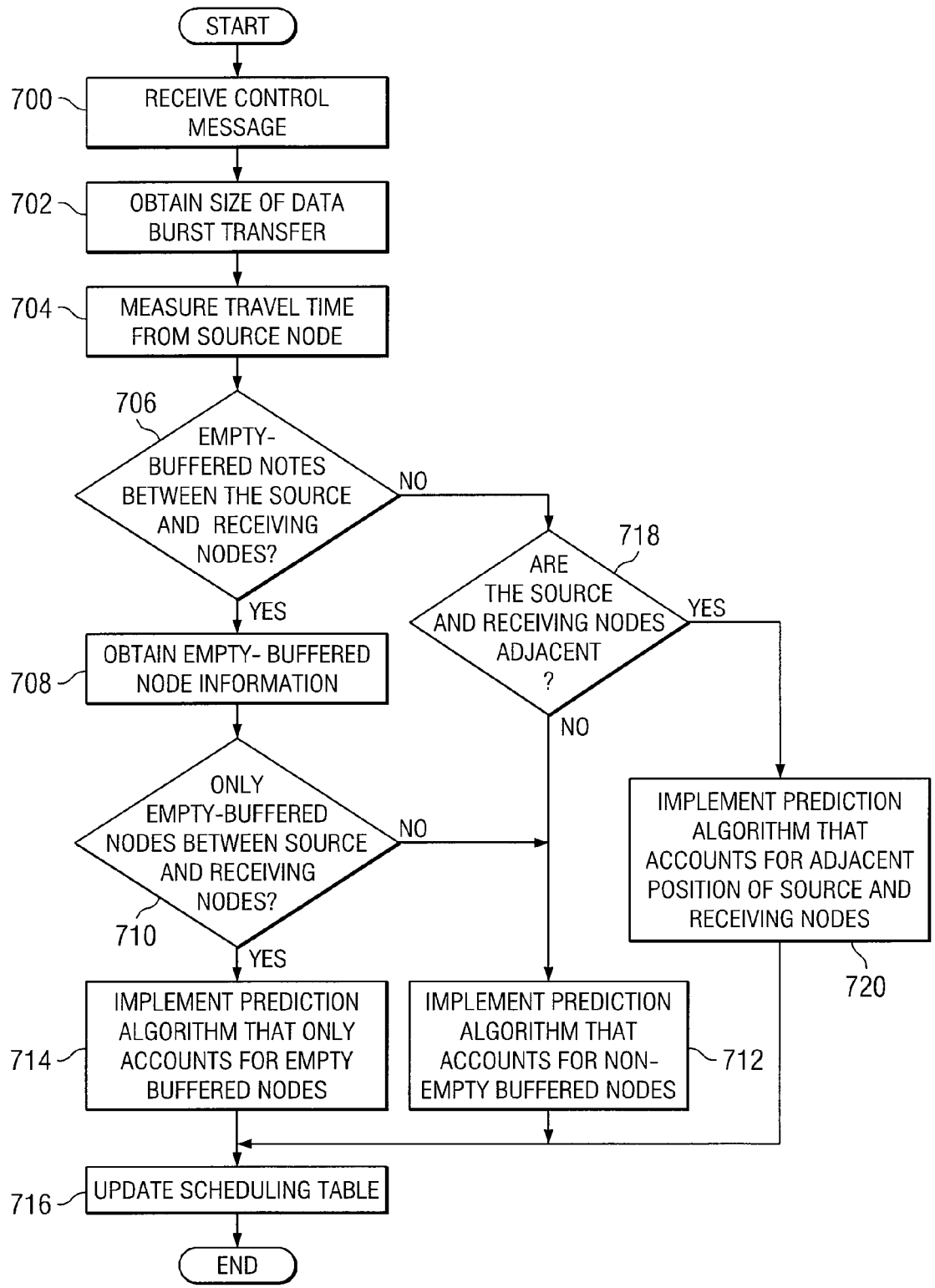
FIG. 7 is a flowchart illustrating a method for implementing predictive scheduling of data channel control.

FIG. 7 is a flowchart illustrating a method for implementing predictive scheduling of data channel control. Electrical components 32 of any suitable node architecture may facilitate the predictive scheduling technique by performing the illustrated method on each wavelength node 12 receives. For example, conventional nodes 12 implement predictive scheduling.

Tokens control access to each data channel. In particular embodiments, node 12 must hold a token to access a data channel for data transmission to one or more destinations. Actual data transmissions are preceded by control messages that identify destinations. Tokens may not be held by nodes 12 for longer than a transmission allocation. After transmitting the data, the token is released. The use of tokens may eliminate network access contentions because, at most, one node 12 may access a data channel at any time.

Predicting the arrival of tokens eliminates the delay that node 12 may experience in handling data transfers and data processing to assemble data for transmission. Conventionally, node 12 cannot begin transferring data from virtual queue 60 until it receives a token. Therefore, if node 12 can predict the token's arrival, assembling the data in output queues 72 for transfer may occur before the token arrives, which allows the data to be sent from output queues 72 with little or no delay when node 12 receives the token.

Referring now to the predictive scheduling flow illustrated in FIG. 7, at step 700, receiving node 12 receives a control message from a source node 12. The source node 12 holds a token that authorizes data transmissions to receiving node 12. In particular embodiments, source node 12 may transmit data to multiple receiving nodes 12. The control message may be received over control channel 18. As described below, by observing information in the control message, a prediction can be made regarding how long source node 12 will hold the token. From the control message, the size of the data burst transfer is obtained at step 702, and the travel time of the control message from the source node 12 is measured at step 704. For example, source node 12 may include a time stamp in the control message, and receiving node 12 may check the current time against the time stamp to compute the travel time. Any other suitable information may also be obtained from the control message as needed.

Predicting the arrival time of a token may occur even if information contained in control messages do not provide the necessary prediction information. For example, if an intermediate node 12 does not include data to transmit, the receiving node 12 does not observe a control message from intermediate node 12 and cannot predict the arrival of the token. Therefore, the receiving node 12 determines whether the intermediate node 12 contains data to be transmitted from outgoing queues 72 or whether the intermediate node 12 has empty outgoing queues 72.

At step 706, it is determined whether any intermediate nodes 12 between source node 12 and receiving node 12 have an empty buffer. Buffers are temporary storage areas for data, such as outgoing queues 72. Again, this empty buffer determination may be made, and this method may be performed, on a wavelength-by-wavelength basis when a separate set of outgoing queues 72 are used for each wavelength. If there are no empty-buffered nodes 12 between source and receiving nodes 12, the method continues to step 718 to determine whether source and receiving nodes 12 are adjacent. If the nodes are adjacent, a prediction algorithm is implemented at step 720 that accounts for the adjacent position of source and receiving nodes 12. In a particular embodiment, the prediction algorithm is $t_A = t_D + t_{S-A}$. Therefore, the predicted arrival time is the token departure time from source node 12 plus the token traveling time between the source and received nodes 12. In this algorithm, $t_D = t_0 + GT + \Sigma B_i/V$ and $t_{S-A}$ is the token traveling time over the link between the source and receiving nodes 12. More particularly, $t_A$ is the token arrival time at receiving node 12, $t_D$ is the token departure time from source node 12, $t_0$ is the time the token timer starts at source node 12, GT is the guard time for optical burst receivers, V is the transmission speed (in bits per second) of the optical burst, and $B_i$ is the data size of optical bursts passing receiving node 12. Each of the above-mentioned parameters are system-wide control parameters that are predetermined when the system is activated or are known to node 12 when the parameter information is needed. For example, GT and V are system-wide predetermined parameters. $B_i$ is measured from the size of contents in outgoing queues 72 in source node 12. Receiving node 12 knows the sizes from the control message. To determine the token departure time from source node 12, the following times are added together: the time the token timer begins at source node 12, the time it takes the receiving node 12 to begin receiving the data burst transfer, and the time to transmit the data burst from the source node.

If the source and receiving nodes 12 are not adjacent, a prediction algorithm that accounts for non-empty and empty-buffered nodes is implemented at step 712. In particular embodiment, this prediction algorithm is $t_A=t_D+t_{S-A}$. In this algorithm, $t_D=t_0+T_h$ and $t_{S-A}=(T_h*N_{A-B})+(T_p*\underline{N}_{A-B})+$ the token traveling time over links between the source and receiving nodes 12. In the equations, $T_h$ is the average token holding time of non-empty-buffered nodes (determined using measurement statistics), $N_{A-B}$ is the number of non-empty-buffered nodes between source and receiving nodes 12, $T_p$ is the token processing time at empty-buffered nodes, and $\underline{N}_{A-B}$ is the number of empty-buffered nodes between source and receiving nodes 12. $T_h$ and $T_p$ are system-wide control parameters, which are communicated to each node 12 on a management-control interface. $N_{A-B}$ and $\underline{N}_{A-B}$ are parameters determined from information in the control header, as described below.

If empty-buffered nodes 12 occur between source and receiving nodes 12, receiving node 12 evaluates information of the one or more empty-buffered nodes 12 (obtained via the control messages) at step 708. Having empty-buffered nodes 12 between source and receiving nodes 12 may skew the token arrival prediction. Accordingly, the prediction technique should account for empty-buffered nodes 12. Any suitable technique may be used to account for empty-buffered nodes 12. For example, the buffer state information of the empty-buffered nodes 12 may be included in the header of the control message. In such embodiments, when the control message is processed by an intermediate node 12, intermediate node 12 determines whether its virtual queue 20 is empty and inserts its number into the first available field in the control message header if virtual queue 20 is empty. Intermediate nodes 12 may process the control message, but the intermediate nodes 12 do not process the contents of the optical bursts.

It is determined at step 710 whether only empty-buffered nodes 12 exist between source and receiving nodes 12. If non-empty and empty-buffered nodes are between source and receiving nodes 12, the prediction algorithm that accounts for non-empty and empty-buffered nodes is implemented at step 712. Otherwise, a prediction algorithm that only accounts for empty-buffered nodes is implemented at step 714. This prediction algorithm is $t_A=t_D+t_{S-A}$. In this algorithm, $t_D=t_0+GT+\Sigma B_i/V$ and $t_{S-A}$ is the token traveling time over links between the source and receiving nodes 12 plus token processing time at intermediate nodes between the source and receiving nodes 12. The information included in the header of the control message is used in the prediction algorithms that consider empty-buffered nodes 12.

Following implementation of each of the prediction algorithms, scheduling table 67, as described in FIG. 5A, is updated at step 716. In the above prediction algorithms, $t_A$ is the value to be updated in scheduling table 67. Using the times in scheduling table 67, node 12 predicts when it will receive a token. Therefore, controller 34 schedules and optimizes data channel control based on the prediction. For example, if node 12 includes data to be transmitted on $\lambda_1$, and the token that authorizes transmission on $\lambda_1$ will arrive at node 12 in 240 µs, node 12 assembles the data in the outgoing queue 72 that transmits data on $\lambda_1$ to prepare for transmission upon receiving the token. Therefore, data in outgoing queues 72 may be assembled before the token arrives, which provides for little or no delay in transmitting data.

Modifications, additions, or omissions may be made to the flowchart in FIG. 7. For example, the control message may also include parameters that node 12 uses to determine how to handle incoming data transmissions. The flowchart may include more, fewer, or other steps. Additionally, steps may be performed in any suitable order and by any suitable component.

Figure 8A:
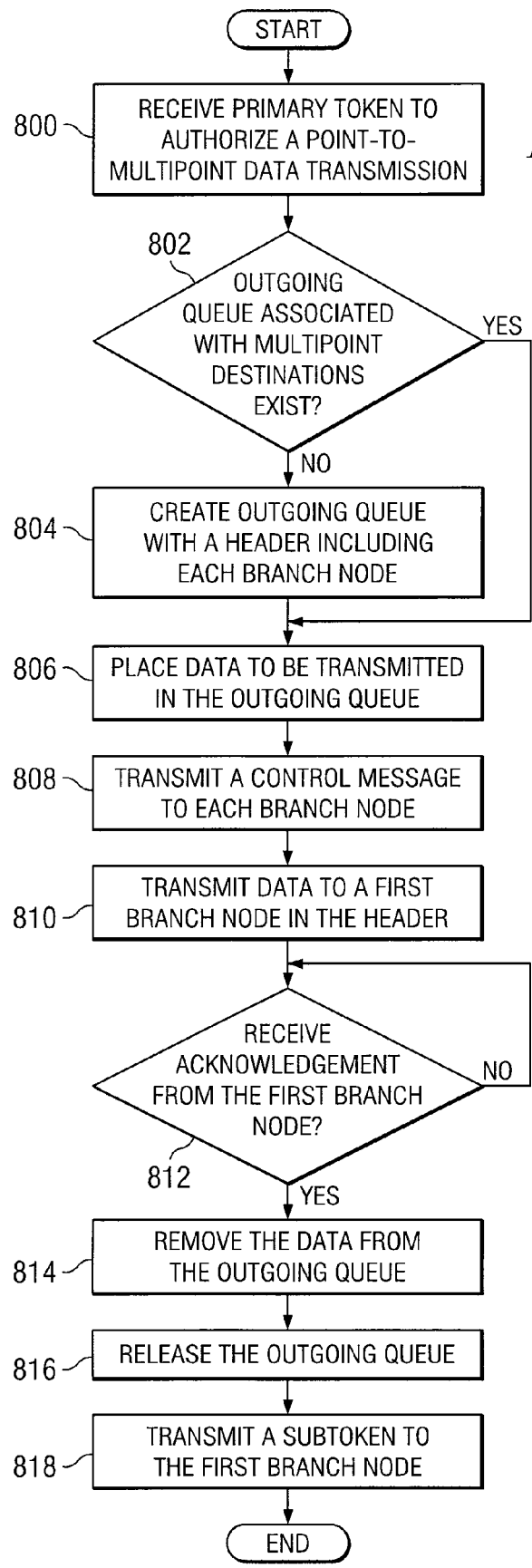
FIG. 8A is a flowchart illustrating a method for communicating data in a point-to-multipoint transmission from a root network node.

FIG. 8A is a flowchart illustrating a method for communicating data in a point-to-multipoint transmission from a root network node 12. At step 800, root node 12 receives a primary token that authorizes a data transmission. Root node 12 may have multiple data transmissions to different destinations that it may need to send using the primary token, but the illustrated method assumes that root node 12 determines the particular point-to-multipoint transmission, as described below, and sends the transmission using the primary token's data transmission authorization. Root node 12 holds the primary token for the duration of the transmission to the first branch node 12. It is determined at step 802 whether an outgoing queue 72 exists that is associated with the multicast destinations to which the node has determined that data will be sent in the transmission window authorized by this token. For example, if a multicast communication occurs from root node 12a to branch nodes 12b, 12c, and 12e, it is determined whether node 12a includes outgoing queue 72 associated with a multicast group comprising nodes 12b, 12c, and 12e. Such an outgoing queue 72 may be created when the root node 12 receives data from a data source 14 to be transmitted to one or more other branch nodes 12 (and other associated data sources 14). If an appropriate outgoing queue 72 does not exist in root node 12, such an outgoing queue 72 is created at step 804. In particular embodiments, a header may be associated with the queue that indicates each branch node 12 in the multicast group. For example, the header may list the branch nodes 12 in a particular order in which the branch nodes 12 receive the multicast transmission. As another example, if network 10 is a ring network, the header may also include the shortest transmission direction to each branch node 12.

After it is determined that an outgoing queue 72 exists or an outgoing queue 72 is created, the data to be transmitted is placed in outgoing queue 72 at step 806. Root node 12 transmits a control message to each branch node 12 at step 808. The control message includes information, such as the additional branch nodes 12 in the multicast transmission, regarding the multicast transmission that branch node 12 may use to configure itself to receive and/or transmit the data. In particular embodiments, the information in the control message may include information used to implement the predictive scheduling technique.

Root node 12 transmits data to a first branch node 12 listed in the header of outgoing queue 72 at step 810. For example, if node 12b is the first listed branch node 12, root node 12a transmits the data to branch node 12b. Because root node 12a includes multiple outgoing queues 72, outgoing queue 72 for the multicast transmission may wait for other outgoing queues 72 to complete their transmissions during the transmission window authorized by the token. The WFQ technique is applied at root node 12 to determine the order of servicing outgoing queues 72.

Root node 12a waits for branch node 12 to receive the data and determines at step 812 whether it receives an acknowledgement from first branch node 12b. If an acknowledgement is not received, root node 12a continues to wait for the acknowledgement (although not illustrated, root node 12a may implement a time-out or other mechanism to re-send the data if an acknowledgement is not received within a certain timeframe). If root node 12a receives an acknowledgement, the data transmitted is removed from outgoing queue 72 at step 814.

Outgoing queue 72 is released at step 816, and root node 12a transmits a subtoken to first branch node 12b at step 818. Subtokens authorize transmission from branch nodes 12. Subtokens are dependent on the primary token. For example, the authorized transmission times of the subtokens are determined from the overall authorized transmission time of the primary token. Thus, each subtoken may only authorize transmission for a time window equaling the window authorized by the primary token less any actual transmission time used by the root node and any previous branch nodes. Releasing outgoing queue 72 may release the used memory, and the outgoing queue 72 may receive additional data to transmit. In another embodiment, releasing outgoing queue 72 may delete outgoing queue 72 from virtual queue 60. In this embodiment, root node 12a creates a new outgoing queue 72 for each multicast transmission in which the node 12 participates. The transmitted subtoken authorizes the branch node 12b to continue the multicast transmission, as discussed in FIG. 8B.

Modifications, additions, or omissions can be made to the flowchart in FIG. 8A. For example, root node 12a may have an outgoing queue 72 created for each multicast destination combination upon initial configuration rather than creating outgoing queue 72 for a multicast group after receiving the token. As another example, root node 12a may increase the size of a previously created outgoing queue 72 to accommodate the multicast transmission. As yet another example, the multicast transmission may be bi-directional and be split into two transmissions from root node 12a. A transmission may go clockwise around the communication ring (for example, to nodes 12b and 12c), while another transmission goes counterclockwise around the communication ring (for example, to node 12e). In this example, outgoing queue 72 may be installed for each direction, one for the clockwise direction and one for the counterclockwise direction, or a single outgoing queue 72 may be installed to support both directions. If multiple outgoing queues 72 are used, queues 72 should be coordinated to confirm data is delivered to all destinations in both directions. If a single outgoing queue 72 is used, the root node 12a receives acknowledgements from the two branch nodes 12b and 12e in opposing directions before the transmission is considered successful. Additionally, the single outgoing queue 72 is serviced twice, once for each direction.

Regarding priority, data carried in one direction may be based on the WFQ scheme, and data carried in the other direction may be based on priority queuing. WFQ queues data in separate outgoing queues 72 and guarantees each queue at least some portion of the total available bandwidth. On the other hand, with priority queuing, each outgoing queue 72 has a unique priority level. An outgoing queue 72 with a higher priority is processed ahead of an outgoing queue 72 with a lower priority. This occurs because once a burst waits a Maximum Media Access Delay (MMAD) at root node 12, the burst may not incur further delays at branch nodes 12. For example, an outgoing queue 72 that transmits the multicast transmission from root node 12a may be processed using WFQ, whereas, outgoing queue 72 in branch node 12b may be processed using priority queuing, which prevents the same multicast transmission from experiencing delays during transmission to each branch node 12. Therefore, the outgoing queue 72 in branch node 12 is serviced whenever branch node 12 receives a subtoken. Because a subtoken of the primary token of root node 12 authorizes the multicast transmission from the branch node 12 rather than a primary token of the branch node 12, multicast transmissions from the branch node 12 are not disadvantaged similarly. As another example, if an outgoing queue 72 in root node 12a services two directions, the priority in one direction may be based on WFQ, while the priority in the opposite direction may be based on priority queuing.

The flowchart may include more, fewer, or other steps. Additionally, steps may be performed in any suitable order and by any suitable component.

Figure 8B:
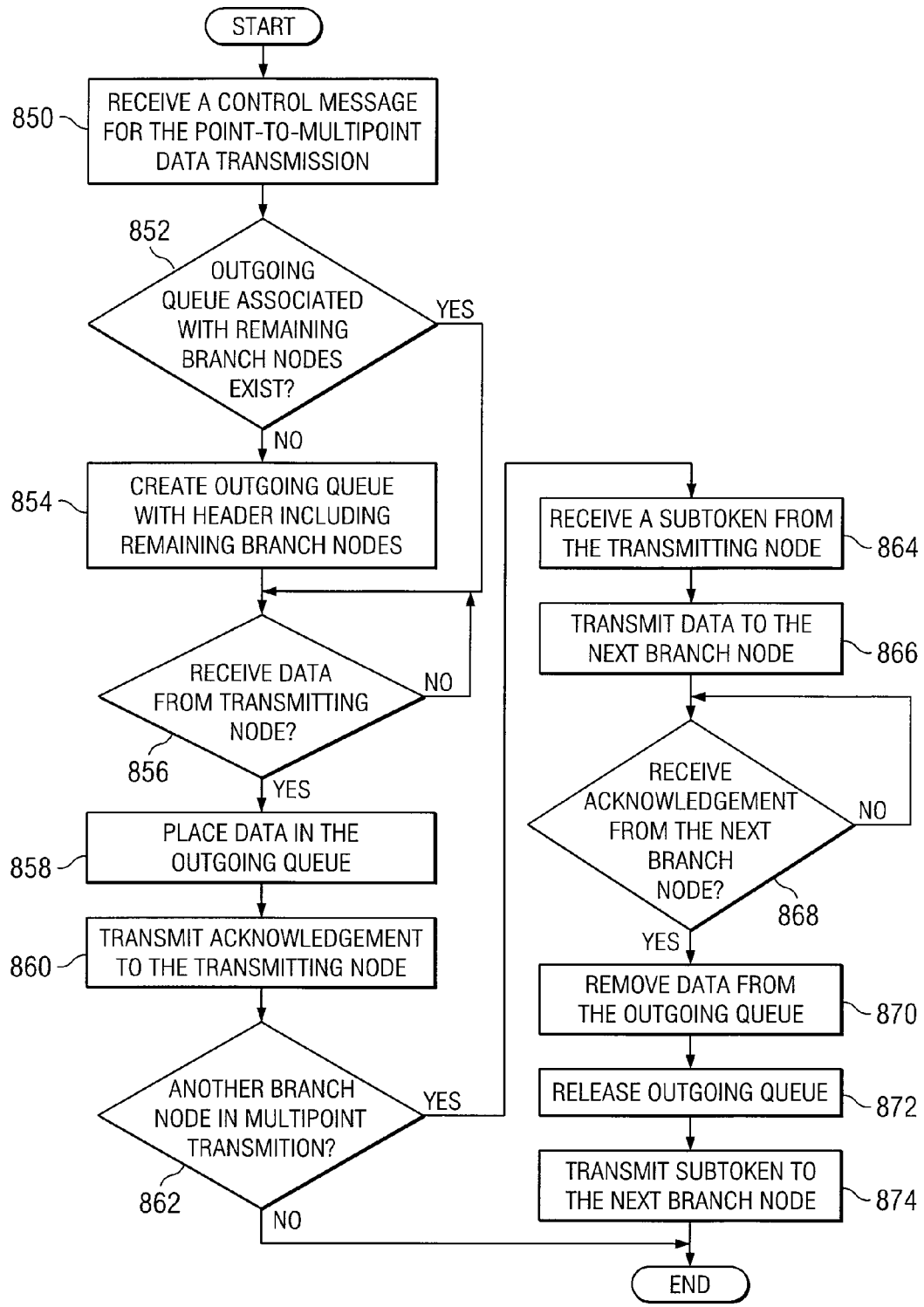
FIG. 8B is a flowchart illustrating a method for communicating the point-to-multipoint data transmission from a branch network node.

FIG. 8B is a flowchart illustrating a method for communicating the point-to-multipoint data transmission from a branch network node 12. At step 850, a branch node 12 receives a control message for the point-to-multipoint transmission. It is determined at step 852 whether an outgoing queue 72 exists that includes the remaining branch nodes 12 of the multicast group. For example, if root node 12a sends a multipoint transmission to branch nodes 12b, 12c, and 12e, branch node 12b determines whether an outgoing queue 72 exists at node 12b that is associated with branch nodes 12c and 12e. If not, an outgoing queue 72 is created at step 854 that is associated with the remaining branch nodes 12.

After it is determined that an outgoing queue 72 exists or an outgoing queue 72 is created, the branch node 12 determines at 856 whether it has received data from transmitting node 12 as indicated in the control message. In the illustrated embodiment, transmitting node 12 refers to any node 12 that transmits data to a branch node 12. For example, transmitting node 12 may be the root node 12, or transmitting node 12 may be another branch node 12 in the multicast group. If data is not received, branch node 12 continues to wait to receive the data. Upon receiving the data, branch node 12 places the data in the appropriate outgoing queue 72 at step 858.

Branch node 12 transmits an acknowledgement to transmitting node 12 at step 860 to indicate that the data was received. At step 862, it is determined whether another branch node 12 exists in the multicast transmission path. Branch node 12 and the multicast group may be set up and determined by the Generalized Multiprotocol Label Switching (GM-PLS)-based point-to-multipoint control plane signaling. If the multicast transmission ends at the current branch node 12, the method subsequently ends.

On the other hand, if one or more additional branch nodes 12 exist in the transmission path, branch node 12 receives a subtoken from transmitting node 12 at step 864. Upon receiving the subtoken, the branch node 12 transmits the data in the outgoing queue 72 to the next branch node 12 at step 866. Outgoing queues 72 associated with multipoint transmissions in branch nodes 12 are treated with priority queuing, as described in FIG. 8A.

In particular embodiments, branch node 12 implements the drop and regenerate technique, as described with respect to FIG. 3C, when transmitting data to another branch node 12. Converting the data to an electrical signal and then regenerating it to an optical signal at each of the multicast destinations guarantees fairness of transmission to other nodes 12.

After the data is transmitted, it is determined at step 868 whether an acknowledgement is received from the next branch node 12. If an acknowledgement is not received, branch node 12 continues to wait for an acknowledgement (although not illustrated, the branch node 12 may implement a time-out or other mechanism to re-send the data if an acknowledgement is not received). If an acknowledgement is received, the data is removed from outgoing queue 72 at step 870. Outgoing queue 72 is released at step 872. Releasing outgoing queue 72 provides for releasing the used memory. The release of outgoing queue 72 in branch node 12 also provides for a downgrade of outgoing queue 72 from priority queuing to WFQ. The queuing may change again with another data transmission. Branch node 12 transmits another subtoken to the next branch node 12 at step 874. The transmitted subtoken authorizes the next branch node 12 to continue the multicast transmission.

Modifications, additions, or omissions may be made to the flowchart in FIG. 8B. For example, branch node 12 may determine whether another branch node 12 exists in the multicast transmission before creating an outgoing queue 72. As another example, the multicast group may have nodes 12 added or deleted from the multicast group. In an embodiment, the added or deleted node 12 may be grafted into or out of the multicast group to prevent traffic loss. For example, to insert node 12 losslessly, a subtree is added between node 12 and the previous node 12 in the distribution tree. The forwarding table of the previous node 12 is not changed. A subtree is then added between node 12 and the subsequent node 12 in the distribution tree. The forwarding table of node 12 points to the subsequent node 12. A subtree is then deleted between the previous node 12 and the subsequent node 12, and the forwarding table of the previous node 12 is changed to point to node 12 instead of the subsequent node 12. Lossless deletion of node 12 uses the above-described example in reverse order. The flowchart may include more, fewer, or other steps. Additionally, steps may be performed in any suitable order and by any suitable component.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. An optical node, comprising:
   optical components operable to transmit and receive optical signals over an optical transmission medium, wherein the optical components comprise:
   a demultiplexer operable to receive a wavelength division multiplexed (WDM) optical signal at an input port and to separate the WDM optical signal into two or more constituent wavelength signals;
   a switching matrix comprising one or more electro-optic switches, each electro-optic switch operable to receive a wavelength signal and switch the signal to one of two outputs, wherein the outputs comprise an output port of the optical node and one or more drop output ports of the optical node, each electro-optic switch further operable to receive a wavelength signal from a transmitter at an add input port associated with the electro-optic switch; and
   a drop coupler associated with each of the drop output ports and an add coupler associated with each of the add input ports, the drop coupler of a each drop output port configured to make a copy of a wavelength signal switched to the drop output port by the associated electro-optic switch and to forward the copy of the wavelength signal to the add coupler of the associated add input port, the add coupler configured to forward the copy of the wavelength signal received from the drop coupler to the switching matrix.

2. The optical node of claim 1, wherein the demultiplexer is a selected one of an arrayed waveguide grating and a wavelength selective switch.

3. The optical node of claim 1, wherein the optical components comprise one or more receivers operable to receive one or more wavelength channels from one or more electro-optic switches of the switching matrix through the one or more drop output ports.

4. The optical node of claim 1, wherein the optical components comprise a first multiplexer operable to combine two or more wavelength signals switched to the output port into a single WDM optical signal.

5. The optical node of claim 4, wherein the first multiplexer is a selected one of an arrayed waveguide grating, a wavelength selective switch, and a coupler.

6. The optical node of claim 4, wherein the first multiplexer is operable to transmit the single WDM optical signal through the output port onto the optical transmission medium.

7. A method for obtaining data intended for an optical node, comprising:
   receiving a wavelength division multiplexed (WDM) optical signal over an optical transmission medium at the optical node through an input port;
   separating the WDM optical signal into two or more constituent wavelength signals;
   switching each constituent wavelength signal to one of two outputs using a switching matrix, wherein the switching matrix comprises one or more electro-optic switches and the outputs comprise an output port of the optical node and one or more drop output ports of the optical node, each electro-optic switch further operable to receive a wavelength signal from a transmitter at an add input port associated with the electro-optic switch;
   receiving a wavelength signal from one of the electro-optic switches at a drop coupler associated with the drop output port of the electro-optic switch, making a copy of the wavelength signal at the drop coupler, and forwarding the copy of the wavelength signal to an add coupler of the add input port associated with the electro-optic switch; and
   forwarding the received copy of the wavelength signal from the add coupler to the switching matrix.

8. The method of claim 7, further comprising receiving one or more wavelength channels, at the one or more electro-optic switches, from the transmitters at the add input ports.

9. The method of claim 7, further comprising transmitting one or more wavelength channels from the one or more electro-optic switches to one or more receivers through the one or more drop output ports.

10. The method of claim 7, further comprising:
    combining two or more wavelength signals switched to the output port into a single WDM optical signal; and
    transmitting the single WDM optical signal through the output port onto the optical transmission medium.

11. A system for obtaining data intended for an optical node, comprising:
    means for receiving a wavelength division multiplexed (WDM) optical signal over an optical transmission medium at the optical node through an input port;
    means for separating the WDM optical signal into two or more constituent wavelength signals; and
    means for switching each constituent wavelength signal to one of two outputs using a switching matrix, wherein the switching matrix comprises one or more electro-optic switches and the outputs comprise an output port of the optical node and one or more drop output ports of the optical node, each electro-optic switch further operable to receive a wavelength signal from a transmitter at an add input port associated with the electro-optic switch;
    means for receiving a wavelength signal from one of the electro-optic switches at the drop output port of the electro-optic switch, making a copy of the wavelength signal, and forwarding the copy of the wavelength signal; and means for received the copy of the wavelength signal and forwarding the copy to the switching matrix.

12. The system of claim 11, further comprising means for receiving one or more wavelength channels, at the one or more electro-optic switches, from one or more transmitters through one or more add input ports.

13. The system of claim 11, further comprising means for transmitting one or more wavelength channels from the one or more electro-optic switches to one or more receivers through the one or more drop output ports.

14. The system of claim 11, further comprising:

means for combining two or more wavelength signals switched to the output port into a single WDM optical signal; and means for transmitting the single WDM optical signal through the output port onto the optical transmission medium.

\* \* \* \* \*